United States Patent [19]

Millar et al.

[11] Patent Number: 4,869,567

[45] Date of Patent: Sep. 26, 1989

[54] OPTICAL COUPLER

[75] Inventors: Colin A. Millar, Felixstowe; Stephen R. Mallinson; Michael C. Brierley, both of Ipswich, all of England

[73] Assignee: British Telecommunications public limited company, United Kingdom

[21] Appl. No.: 93,528

[22] PCT Filed: Dec. 29, 1986

[86] PCT No.: PCT/GB86/00802

§ 371 Date: Aug. 21, 1987

§ 102(e) Date: Aug. 21, 1987

[87] PCT Pub. No.: WO87/04260

PCT Pub. Date: Jul. 16, 1987

[30] Foreign Application Priority Data

Dec. 30, 1985 [GB] United Kingdom ................ 8531870
Dec. 30, 1985 [GB] United Kingdom ................ 8531869

[51] Int. Cl.$^4$ .............................................. G02B 6/26
[52] U.S. Cl. .............................. 350/96.15; 350/96.17
[58] Field of Search ............ 350/96.15, 96.16, 96.29, 350/96.17

[56] References Cited

U.S. PATENT DOCUMENTS

| | | | |
|---|---|---|---|
| 3,899,235 | 8/1975 | Arnaud et al. | 350/96.10 |
| 3,957,341 | 5/1976 | Taylor | 350/96.15 |
| 4,021,097 | 5/1977 | McMahon | 350/96.10 |
| 4,026,632 | 5/1977 | Hill et al. | 350/96.15 |
| 4,315,666 | 2/1982 | Hicks, Jr. | 350/96.15 |
| 4,342,499 | 8/1982 | Hicks, Jr. | 350/96.29 X |
| 4,387,954 | 6/1983 | Beasley | 350/96.15 |
| 4,483,583 | 7/1984 | Unger | 350/96.15 |
| 4,601,541 | 7/1986 | Shaw et al. | 350/96.15 X |
| 4,666,235 | 5/1987 | Pavlath | 350/96.15 |

FOREIGN PATENT DOCUMENTS 2278086 2/1976 France .
2558607 7/1985 France .
2096790 2/1982 United Kingdom .
2170016 7/1986 United Kingdom .

OTHER PUBLICATIONS

Patent Abstracts of Japan, vol. 4, No. 15 (E-170) (106) Feb. 5, 1980 and JP A, 54156555 (Mitsubishi Denki KK) Dec. 10, 1979.
Patents Abstracts of Japan, vol. 3, No. 139 (E-152), Nov. 17, 1979, see the whole document, & JP, A, 54118255 (Matsushita Denki Sangyo K.K.) Sep. 13, 1979.
Applied Physics Letters, vol. 28, No. 4, Feb. 15, 1976, American Institute of Physics, (US), J. M. Hammer et al.: "Optical grating coupling between low index fibers and high-index film waveguides", pp. 192-194, see paragraphs 1-6, FIG. 1.
Patent Abstracts of Japan, vol. 3, No. 139 (E-152) (154), Nov. 17, 1979, see the whole document & JP, A, 54118255 (Matsushita Denki Sangyo K.K.) Sep. 13, 1979.
Patent Abstracts of Japan, vol. 1, No. 38 (E-76) (2448), Apr. 19, 1977, JP A 51135548 (Ritsuo Masumi) Nov. 24, 1976 Patent Abstracts of Japan, vol. 7, No. 82, (P-189); (1227), Apr. 6, 1983, JP A 5810705 (Tateishi Denki KK) Jan. 21, 1983.

Primary Examiner—John D. Lee
Assistant Examiner—Phan T. Heartney
Attorney, Agent, or Firm—Nixon & Vanderhye

[57] ABSTRACT

An optical coupler device comprises a waveguide structure underlying a first layer of material which has a refractive index higher than the effective refractive index of the waveguide structure and which is capable of supporting propagation modes of a higher order than, but matching the phase velocity of, the propagation mode or modes in the underlying waveguide structure, said layer thereby forming a wave guiding structure.

26 Claims, 4 Drawing Sheets

OPTICAL COUPLER

This invention relates to coupler devices, and in particular to optical coupler devices.

According to the present invention, a frequency selective optical coupler device comprises a waveguide underlying a first layer of material which has a refractive index higher than the effective refractive index of the waveguide and which forms a planar waveguide capable of supporting and guiding at least one propagation mode of a higher order than, but matching the phase velocity of, the propagation mode or modes in the underlying waveguide.

The first layer may be overlayed by a further layer forming a non-guiding substrate having a substantially planar surface and a refractive index which is lower than the effective refractive index of the first layer for a given mode of propagation.

The first layer and/or the substrate may be uniform or non-uniform in comparison, and preferably of uniform refractive index.

The first layer and substrate are preferably in intimate contact, but may instead be spaced a small distance apart, for example byy one or more intervening layers, or an air gap. The waveguide and the first layer are also preferably spaced a small distance apart, but may be in intimate contact. For effective coupling, close proximity of the waveguide and first layer is required for strong field coupling, providing a degree of lateral confinement of the field in the first layer.

The waveguide conveniently comprises an optical fibre, and preferably an optical single mode fibre.

In another form of the invention, the waveguide may comprise a waveguide associated with, or forming part of, an integrated optics device.

The first layer and/or the substrate may be provided with means, such as electrodes, for example, to modify the optical properties of the associated layer, thereby to permit control of the operation of the coupler device.

Coupler devices according to the invention may be used to form optical modulators, filters, and other devices operating on an optical signal at distinct positions along the length of an optical fibre, preferably a single mode fibre.

An important aspect of the present invention is that the index of the planar waveguide may be appreciably greater than the effective index of the waveguide, that is to say, in the case where the waveguide is a fibre, and the planar waveguide a film for example, that $n_{film}$ greater than $ne_{fibre}$, provided that $ne_{film}$ is approximately equal to $ne_{fibre}$ The refractive index (n) of a material is understood herein to be the bulk refractive index of the material as determined bymeans of an Abbe refractometer, for example. The effective refractive index (ne) is the ratio of the speed of light in vacuo (c) to the phase velocity (vp) of the guided mode concerned.

The refractive index of the first layer is conveniently at least 1°/o to 10°/o, and preferably at least 15°/o to 20°/o, greater than the effective refractive index of the waveguide. However, it has been calculated that efficient coupling will be obtained even in cases where the refractive index of the first layer is 60°/o higher than the effective refractive index of the waveguide.

The present invention will now be described further by way of examples and with reference to the accompanying drawings, of which:

Figure 1:
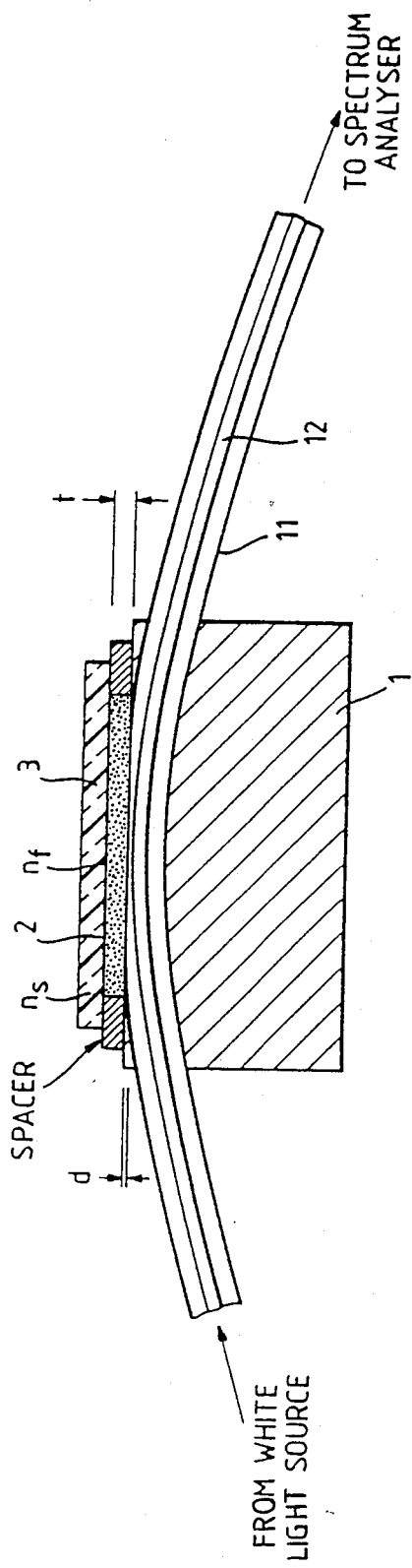
FIG. 1 is a schematic sectional view through a channel dropping optical filter device according to the present invention.

Referring first to FIG. 1 of the drawings, an optical channel dropping filter or coupler in accordance with the present invention comprises a polished optical fibre half-coupler 1 incorporating an optical single mode fibre wave guide, 11 and underlying a first layer formed by a thin film 2. A substrate in the form of a fused silica slide 3 is mounted on top of the film 2. This serves to form a boundary for the film, as it has lower refractive index and reduces radiative loss from the film. The exposed fibre length was approximately 520 $\mu$m, which is close to the coupling length allowing good coupling into the overlay. Also, close proximity of fibre and overlay ensured good coupling. Optical fibre half-couplers of this type are described, for example, by B. Nayar, "Int Optics", Eds. Nolting and Ulrich, Springer Series in Opt. Sc., Vol. 48, Springer Verlag 1985. The construction of the polished half-couplers as such is not of the essence of the present invention and hence need not be discussed here in detail. For the present purposes it is sufficient to note that the fibre 11 was standard British Telecom Type "B" single mode fibre, that the radius of the fibre curvature in the half-coupler was 25 cm, and that the cladding of the fibre 11 was removed by polishing to within 1 $\mu$m of the fibre core 12.

Optical fibres such as those used in the fabrication of the half-couplers have an effective refractive index of approximately 1.45 at a wavelength of nominally 1.5 $\mu$m.

The thin film overlay 2 is a thin overlay of proprietary refractive index liquid, eg as supplied by Cargille Inc. of 55 Cedar Grove, N.J., USA. In this example, a methyl salicylate film was used, having a refractive index of about 1.52. The thickness of the film used was approximately 39 $\mu$m, although a wide range of thicknesses would be suitable (eg 1-200 $\mu$m).

Figure 2:
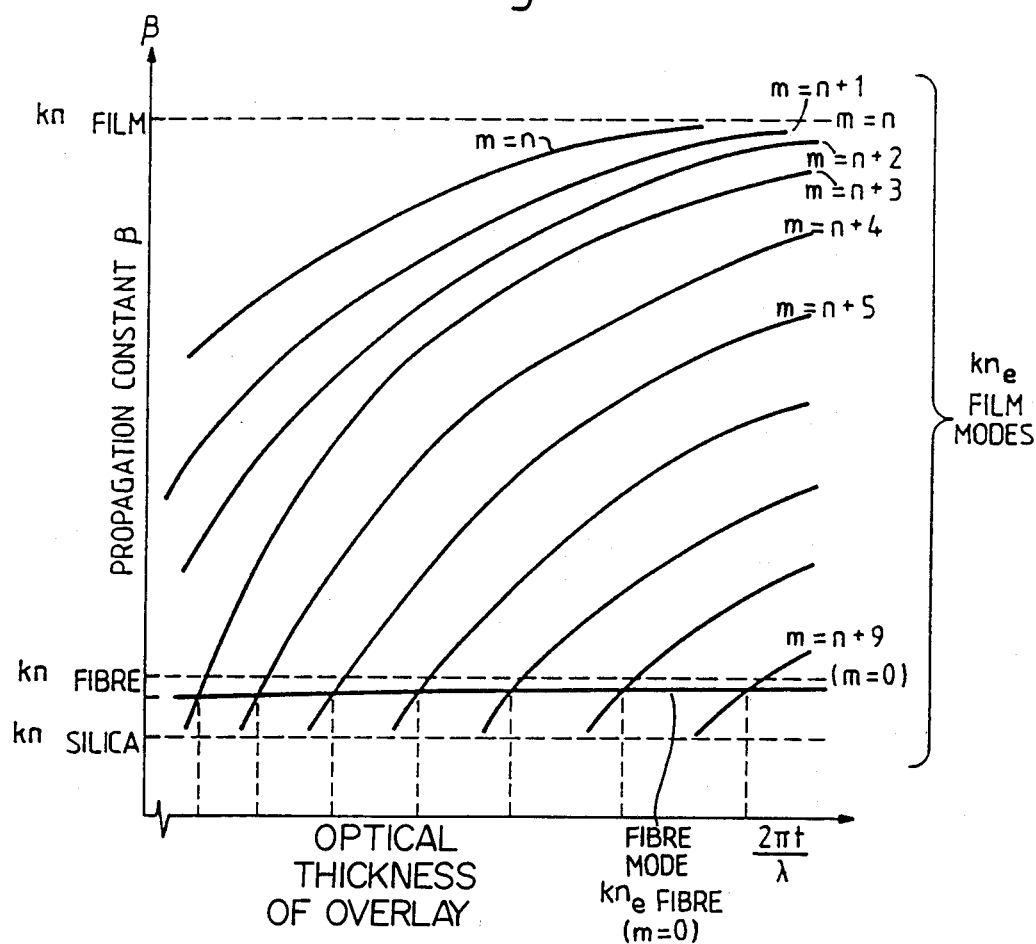
FIG. 2 is a mode dispersion diagram.

FIG. 2 is a mode dispersion diagram showing the variation in propagation constant $\beta$, where $\beta = kn_e$, with normalised thickness $2\pi t/\lambda$ where t is the thickness of the overlay. For all the materials of the device, the variation in the material dispersion (ie the variation of the index of the material with wavelength) has been ignored.

As can be seen from the graph, $kn_{e\,fibre}$ for the fibre 11 and $kn_{silica}$ for the silica slide 3 remain approximately constant over a large wavelength region. For the fibre 11, propagation takes place in a single mode only, the fundamental (m=o). Propagation in the thin film overlay 2 takes place in a series of mode orders below the cut-off value m=n through a range n+1 ... n+9 etc. as shown on the graph.

Channels of a transmitted wave length multiplexed optical signal are coupled to the thin film overlay 2 only when the $\beta$ lines on the dispersion diagram cross (FIG. 2) ie where there is an intersection between the $\beta$ line for the fibre 11 and the β line for a given mode of the overlay 2. Since each film mode propagates at different wavelengths for a constant optical thickness, the coupled channels occur at approximately equal wavelength intervals. The interaction length between fibre and overlay is selected so as to permit only one traverse of the coupler (or any odd number traverses), thereby causing coupling of channels into of the overlay. The remainder of the light appears at the output port of the half-coupler (much against intuitive expectations). In this state the phase velocity mismatch ensures low insertion loss, and, conversely, when coupled, the matching of the phase velocity and correct coupling length give a high rejection ratio. (The rejection ratio is the ratio between the intensity of light in the fibre in the coupled and uncoupled states). There are thickness conditions for overlay films of all index values greater than $n_e$ which the light in the fibre will ignore or couple to, depending on the design. This aspect has implications not only for the devices but for the construction and use of polished directional couplers with thin matching layers interposed between them.

There is strong coupling from the single mode fibre 11 to the film 2, producing a degree of three dimensional wave confinement in the film. This helps reduce optical loss through non-axial leakage of radiation from the film.

Figure 3:
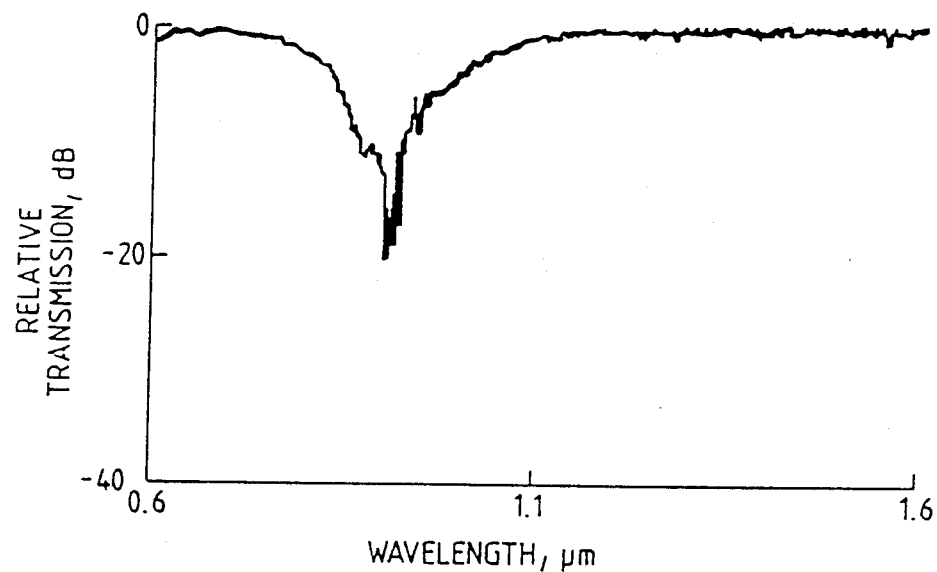
FIG. 3 is a graph showing transmission vs wavelength for the half-coupler of the device of FIG. 1 with a thin overlay film.

The examples below illustrate the results which can be achieved using a variety of overlays. With thin overlays (eg 1 to 5 μm) there are only a few modes or a single mode in the overlay to couple to. An example using the device of FIG. 1, but with a thinner film is shown in FIG. 3. There was no deliberate gap between the half-coupler and overlay (so that the actual gap was about 1 μm). A thin film mode coupled to the fibre mode (the fundamental) at about 900 nm so light transferred at this wavelength from fibre to film. Increasing the pressure decreased the film thickness which shifted the rejected band to about 775 nm. Since (See P. K. Tein, Applied optics Vol 10, PP 2395–2413, 1971):

$$2\pi(n^2 \text{film} - n_e^2 \text{fibre})^{\frac{1}{2}} t/\lambda \approx m\rho$$

where t is the thickness of the film and m the mode order, then in order to couple into a particular mode, $t/\lambda$ must be constant for given refractive indices. If t decreases then so must the coupling wavelength, in agreement with the observation. Note that the excess loss when the channel is not being dropped is negligible.

The coupling properties of the device may be varied by, for example, altering the thickness of the overlay. A thin elastic film whose thickness is changed piezoelectrically can operate to provide devices such as, for example, tunable channel dropping filters, variable attenuators (note also that one band could be attenuated whilst not another), pressure/displacement sensors, on/off switches, sonic-optical transducers (microphones) and so on.

Figure 4:
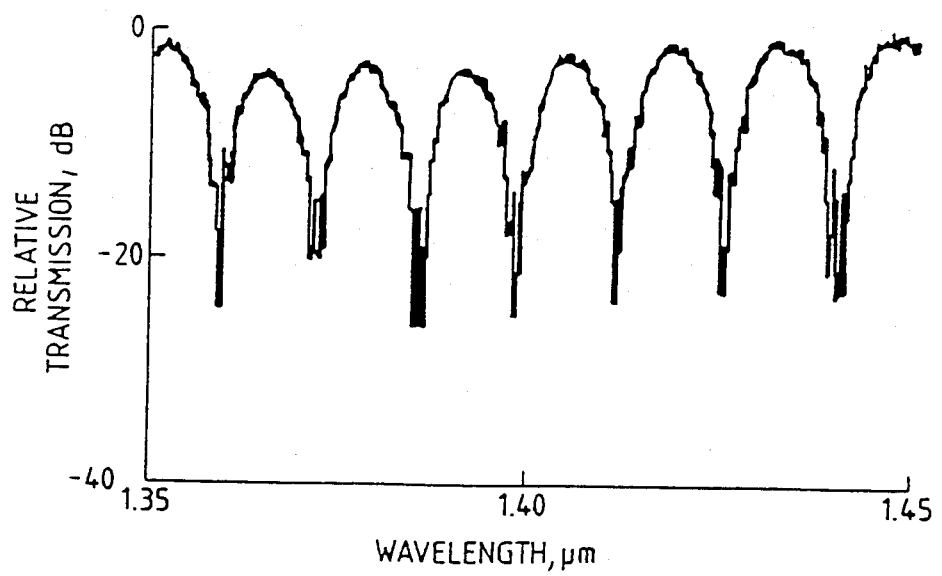
FIG. 4 shows the output of a device with a thicker overlay.

FIG. 4 illustrates the output of fibre in a thick film device. Table 1 summarizes the results obtained from experiments with devices with films of different thickness. The results show that a comb filter with about 12 nm dropped channel separation can easily be made. It is remarkable that at such large thickness, modes still exist in the overlay and that they interact so effectively with the fibre mode. There is no reason why narrower comb responses could not be achieved, by increasing the thickness and film index, although it should be noted that as the thickness increases, difficulty in obtaining parallelism results in increased loss. Non-planar overlays are generally to be avoided.

A comb filter may be provided where the width of the coupled channel is several nm (eg 5) and the channel separation is typically 10 nm, with greater than 20 dB rejection ratio and negligible insertion loss (say 0.5 dB).

With thick overlays the fibre mode (m=o for monomode fibre) couples to a higher order mode in the overlying film close to the cut-off value (m=n in FIG. 2). This mode can propagate long distances without degradation. As can be seen in FIG. 4 the spectral separation of the dropped channels is large, and the width of these channels is also large. In fact, coupling to higher order modes in the overlying films allows great flexibility in the choice of refractive index and thickness, and there is no requirement for close tolerances, since all that is generally needed is at least one mode in the overlay which is phase velocity matched to mode(s) in the fibre. A wide range of materials and thicknesses are suitable for the overlay. The order of the propagation mode in the overlay may vary from 1 to about 200, depending on which mode or modes match the phase velocity of a mode in the fibre.

Changing the index of the overlay can tune the filter appropriately. This could be done by having an electro-optic material mechanically sliced and polished and sandwiched between the coupler and the silica block. At a fixed wavelength slight phase velocity changes may induce large attenuation changes.

Figure 5A:
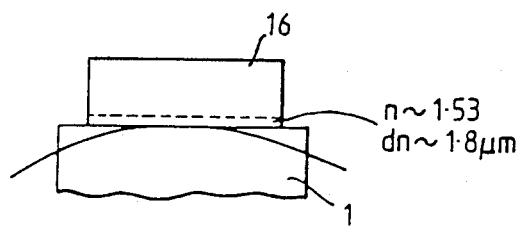
FIGS. 5A and 5B illustrate the effects of a solid wave guide overlay.
Figure 5B:
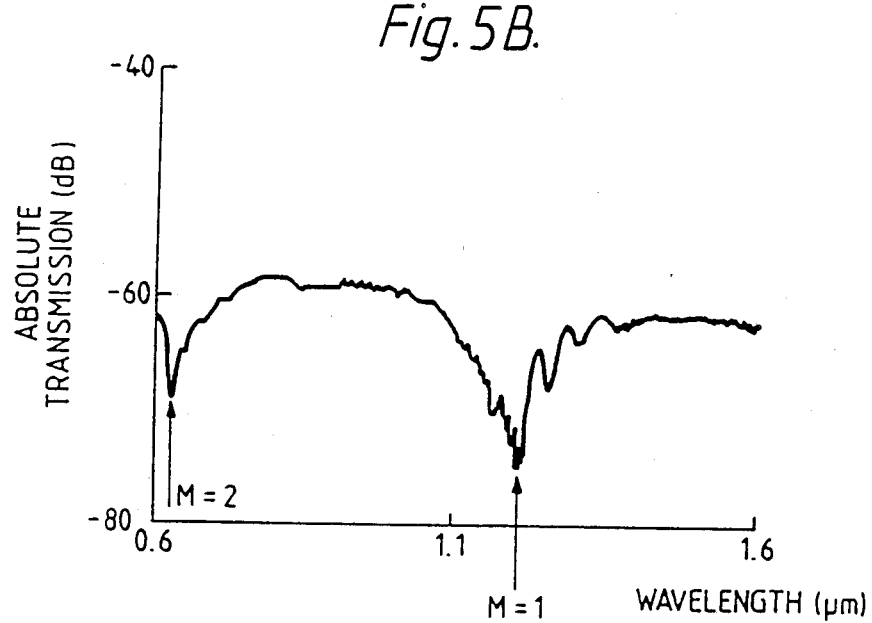

In FIG. 5A a thin wave guide on silica 16 was used as the overlay with no spacer. Strongly coupling into the film was observed at two well-defined wavelengths (see FIG. 5B), demonstrating that the technique can be used to couple into integrated optic wave guides. This is particularly significant because it indicates that directional coupling between standard fibres and planar wave guides is possible.

Note that, if desired, the overlay may take the form of a rectangular waveguide.

In summary, the most important finding of this work is that the range of indices (and therefore materials) available to directionally couple into from silica fibre half couplers is $$n_{film} > n_{efibre}$$

There is no upper limit on $n_{film}$. The ability of the coupling to be independent of material index widens the range of material options and functions which are available. Indeed efficient coupling does not depend on film mode order, and therefore thick or thin films are equally important—the fabrication techniques are extensive and device possibilities quite vast.

For subject matter related to the present invention, the reader is referred to a co-pending patent application "Optical Coupler Devices" of even date, in the name of the present applicants and claiming priority from UK patent application Nos. 8531869 and 8531870 filed on 30th Dec. 1985 and corresponding to U.S. patent application Ser. No. 07/095,575, filed 21 Aug. 1987, now allowed; the contents of that application is incorporated herein by reference.

TABLE 1

Channel Dropping Filter:
Table of results
Wavelength region 1.38μm
Overlay index 1.49 ($n_D$)

| Overlay Thickness | Coupled channel | Channel Separation | Rejection Ratio | Excess Loss | Modes |
|---|---|---|---|---|---|
| 86μm | 7nm | 12nm | 26dB | 3dB | 103/104 |
| 13μm | 28nm | 80nm | 19dB | 0.3dB | 15/16 |
| 4.2μm | 40nm | 253nm | 18dB | 0dB | 5/6 |

We claim:

1. A frequency selective optical coupler device comprising a first waveguide underlying a layer of material which has a refractive index substantially higher than the effective refractive index of the first waveguide and which layer forms a planar second waveguide whose effective refractive index is approximately equal to the effective refractive index of the first waveguide and which second waveguide is capable of supporting and guiding at least one propagation mode of higher order than, but matching the phase velocity of, propagation mode or modes in the underlying first waveguide and wherein there is no further waveguide structure disposed between said first and second waveguides.

2. An optical device as in claim 1, wherein said layer is overlayed by a non-guiding substrate having a substantially planar surface and a refractive index which is lower tha the effective refractive index of said layer for a given mode of propagation.

3. An optical device as in claim 2 wherein said layer and said substrate are in intimate contact with each other.

4. An optical device as in claim 1 or claim 3, wherein the first waveguide and second waveguide are spaced a small distance apart.

5. An optical device as in any one of claims 1, 2, or 3 wherein the first waveguide comprises a single mode optical fibre.

6. An optical device as in claim 1, 2, or 3 wherein said layer comprises a thin film extending along and transversely to the said first waveguide.

7. An optical device as in claim 1 or 2, wherein the planar second waveguide comprises an integrated optics device.

8. An optical device as in claim 1 or 2, provided with means to modify the optical properties of the device thereby to permit control of the operation of the device.

9. An optical device as in claim 8, wherein said means is adapted to alter the thickness or refractive index of said layer.

10. An optical device as in claim 1 or 2, wherein the refractive index of said layer is at least 1% to 15% greater than the effective refractive index of the first waveguide.

11. An optical device as in claim 1 or 2, wherein the refractive index of said layer is at least 15% to 20% greater than the effective refractive index of the first waveguide.

12. An optical device as in claim 1 or 2, wherein the refractive index of said layer is at least 20% to 30% greater than the effective refractive index of the first waveguide.

13. An optical device as in claim 1 or 2, wherein the refractive index of said layer is of the order of 50% greater or more than the effective refractive index of the first waveguide.

14. An optical device as in claim 4 wherein said layer comprises a thin film extending along and transversely to the said first waveguide.

15. An optical channel dropping filter comprising:
first optical waveguide means for propagating a single propagation mode of light at a first phase velocity, said first waveguide means having a first effective refractive index; and
further, planar waveguide means strongly optically coupled to said first waveguide means, said planar waveguide means for propagating at least one further light propagation mode having a higher order than said single propagation mode but also at said first phase velocity, said planar waveguide means having a second refractive index which is at least 1% greater than said first refractive index,
wherein the first waveguide means, and said planar waveguide means both have approximately equal effective refractive indices,
wherein at least one wavelength of light propagating through said first waveguide means is filtered out through coupling from said first waveguide means to said planar waveguide means.

16. An optical channel dropping filter as in claim 15 wherein said first waveguide means comprises a single mode optical fiber.

17. An optical channel dropping filter as in claim 15 or 16 wherein said planar waveguide means includes a film layer extending transversely to said first waveguide along an interaction length dimensioned so as to permit only an odd number of traverses of light through said filter.

18. An optical channel dropping filter as in claim 15 further including means operatively coupled to said planar waveguide means for adjusting an optical parameter of one of said first and further waveguide means so as to change said wavelength which is filtered.

19. An optical channel dropping filter as in claim 15 wherein said planar waveguide means supports a two-dimensional field component and laterally confines at least one mode of light propagating therethrough.

20. An optical channel dropping filter as in claim 15 further including nonguiding substrate means optically coupled to said planar waveguide means, said substrate means having a refractive index lower than said second index, said substrate means for providing a boundary for and reducing the radiative loss of said planar waveguide means.

21. A frequency selective optical signal filter for absorbing optical signals of selected frequency from a single mode optical waveguide, said filter comprising:
a single mode optical waveguide having a core and a cladding layer, said optical fibre having an effective refractive index of $n_e$; and
a planar thin film waveguide of thickness t closely and strongly optically coupled to the optical fibre core via a thinned section of cladding layer, said planar waveguide having a bulk refractive index n much greater than $n_e$ but having an effective refractive index $n'_e$ which is approximately equal to $n_e$;
wherein single mode optical signals of frequency f are selectively coupled to and substantially absorbed by higher propagating modes of said thin film waveguide, said frequency f being a function of film thickness t.

22. A frequency selective optical signal filter as in claim 21 wherein said thin film is substantially in direct contact with said thinned section of cladding of the single mode waveguide.

23. A frequency selective optical signal filter as in claim 21 wherein said single mode waveguide is an optical fibre.

24. A frequency selective optical signal filter as in claim 21 wherein n is at least 1% to 10% greater than $n_e$.

25. A frequency selective optical signal filter as in claim 21 wherein n is at least 15% to 20% greater than $n_e$.

26. A frequency selective optical signal filter as in claim 21 wherein n is at least 60% greater than $n_e$.

* * * * *